US005799685A

United States Patent [19]

Tezuka et al.

[11] Patent Number: 5,799,685

[45] Date of Patent: Sep. 1, 1998

[54] TANK PROTECTIVE CONTAINER

[75] Inventors: Youichi Tezuka; Shoichi Tanaka; Makoto Wakaki; Akihiko Osako; Kazuhito Nakamura, all of Tokyo, Japan

[73] Assignee: Mitsubishi Materials Corporation, Tokyo, Japan

[21] Appl. No.: 757,167

[22] Filed: Nov. 27, 1996

[30] Foreign Application Priority Data

Nov. 28, 1995 [JP] Japan .................................... 7-309587

[51] Int. Cl.$^6$ .................................................... F16K 31/00

[52] U.S. Cl. ............................................ 137/375; 137/382

[58] Field of Search ..................................... 137/375, 382

[56] References Cited

U.S. PATENT DOCUMENTS

| | | | |
|---|---|---|---|
| 1,909,288 | 5/1933 | Link | 137/375 |
| 2,339,082 | 1/1944 | Kromer | 137/375 |
| 2,542,543 | 2/1951 | Losee | 137/375 |
| 2,604,888 | 7/1952 | Ritter | 137/375 |
| 2,673,010 | 3/1954 | Barrow | 137/382 |

*Primary Examiner*—A. Michael Chambers
*Attorney, Agent, or Firm*—Armstrong, Westerman, Hattori, McLeland & Naughton

[57] ABSTRACT

A tank 1 having a valve 6 in a head portion 4 and protected by a substantially cylindrical head skirt portion 7 is accommodated in a protective container 2. A load receiving member 23 having a projection 23*c*, to which a free end 7*a* of the head skirt portion 7 is fixed, is disposed between the head skirt portion 7 and the head support member 11. The head support member 11 is formed into a triple-layer structure formed by stacking, when viewed from the tank, a first layer having strong deformation resistance, and second and third layers 15 and 16 having weak deformation resistance. The second layer 15 includes an annular outer layer 15*a* having deformation resistance weaker than that of the first layer and an inner layer 15*b* fitted in the central space and having much weaker deformation resistance. The third layer 16 is made of the same material as that of the outer layer of the second layer. A rotation-stopper 20 is provided for the head skirt portion 7 so as to be attached to the protective container 2. The tank, with the above-described structural arrangements, has improved impact resistance in case of a fall or the like, while having an overall shortened length and reduced size.

6 Claims, 4 Drawing Sheets

FIG. 6
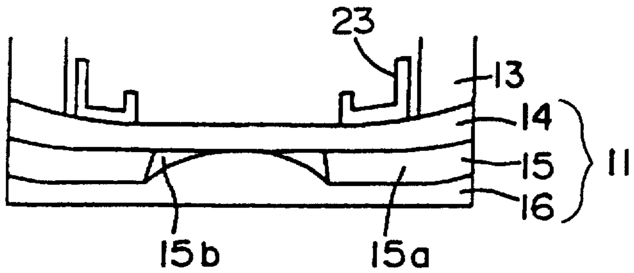
FIG. 7
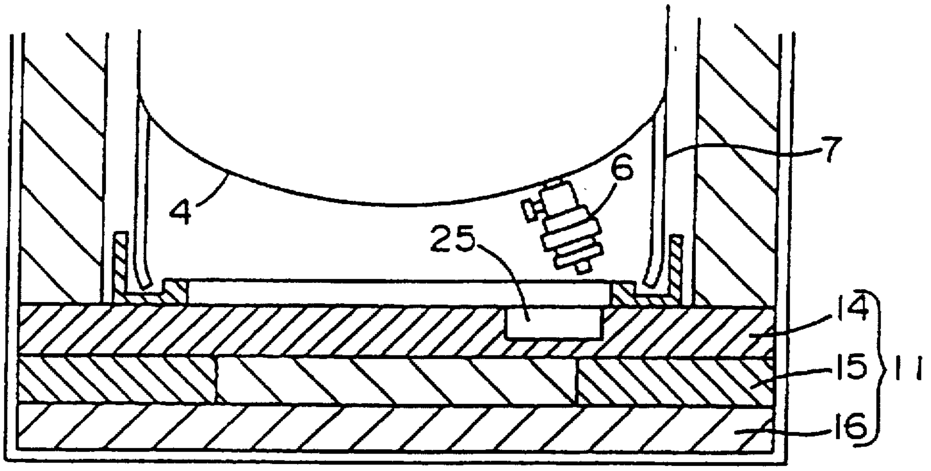
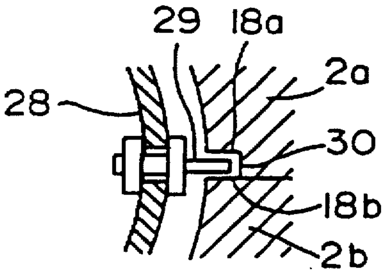
FIG. 8

TANK PROTECTIVE CONTAINER

BACKGROUND OF THE INVENTION

1. Field of the Invention

The present invention generally relates to a tank protective container for protecting a tank when the tank (in particular, a $UF_6$ tank) is stored or transported.

2. Description of Relevant Art

A $UF_6$ tank filled with $UF_6$ has been stored or transported in such a manner that the tank is accommodated in, for example, an external protective container.

The $UF_6$ tank (hereinafter, referred to as a "tank") is formed into, for example, a capsule-like shape and has a valve on one of spherical-surface-like end surfaces thereof. An end portion of the tank which includes the valve is called a "head portion", and another end of the tank, opposite the end portion called the "head portion" is called a "bottom portion". A cylindrical skirt portion is formed on each of the head and bottom portions of the tank.

The protective container is formed into, for example, a cylindrical shape to be adaptable to the shape of the tank. A head portion and a bottom portion of the protective container are closed by disc-like support members made of an appropriate material (for example, oakwood) having appropriate impact resistance. Furthermore, a heat insulating member is placed in the side of the protective container. In order to mount and remove the tank, the protective container is divided into two sections along a plane including the lengthwise directional axis thereof, the two sections being connected to each other after the tank has been mounted.

A protective container of the foregoing type is subjected to drop tests and a thermal (fire) test which is performed after the drop tests, in such a state where the tank is accommodated so as to evaluate the safety of the tank against accidental conditions. In particular, in order to protect the valve from being damaged, if the tank falls or is subjected to fire, the protective container must have satisfactory shock absorbing characteristics. Therefore, the foregoing support members having a predetermined thickness have been employed in each of the head and bottom portions of the protective container.

The protective container is subjected to the tests or the like in which the protective container is caused to fall in such a manner that its head portion faces downwards, and in which the support members of the head portion of the protective container locally deform so that shock is dispersed and absorbed. As a result, the valve located inside of the skirt portion of the head portion of the tank can be protected from being damaged.

However, the foregoing protective container, having the structural arrangement whereby the support members for each of the head portion and the bottom portion disperse and absorb the shock, has the characteristic that the support members for each of the head portion and the bottom portion are thickened to protect the tank. Therefore, the overall length of the protective container cannot be shortened, and the size of the same cannot be reduced. Thus, a large space has been required to locate or accommodate the protective container, and manufacturing, storing and transporting thereof cannot be performed efficiently. Therefore, there arises a problem in that cost cannot be reduced.

In view of the foregoing, an object of the present invention is to provide a tank protective container, the size of which can be reduced and with which the safety of the valve and the like can be improved.

SUMMARY OF THE INVENTION

A tank protective container according to the present invention, arranged so as to accommodate and protect a tank, which has a valve in the head portion thereof and a substantially cylindrical head skirt portion adjacent to the head portion thereof, and provided with the support members at least in the head portion (and the bottom portion) thereof. The protective container for a tank includes a load receiving member disposed between the head skirt portion and the head support member and has a projection to which a free end of the head skirt portion is fixed.

The impact, generated when the protective container falls, whereby its head faces downwards and collides with the ground or the like, is transmitted to the head support member while being dispersed and absorbed by the load receiving member. Therefore, the fear of possible intrusion of the free end of the head skirt portion into the head support member or expansion of the head support member towards the tank due to the impact load causing the valve to collide with the head support member can be eliminated. Moreover, since the projection fixes the free end of the head skirt portion, deformation of the head skirt portion can be prevented.

The load receiving member includes a bottom portion disposed between the head skirt portion and the head support member, a side wall portion extending on the radial directional outside of the bottom portion and formed along the outer surface of the head skirt portion, and a projection extending from the bottom portion and formed on the inside of the side wall portion.

Therefore, the impact resistance can be improved and the head support member can be thinned as compared to the conventional structure.

A tank protective container, according to the present invention, is arranged so as to accommodate and protect the tank. Such tank protective container has a valve in the head portion thereof and a substantially cylindrical head skirt portion adjacent to the head portion thereof, and is provided with the support member at least in the head portion (and the bottom portion) thereof. Such protective container for a tank includes a structure formed by the head support member and has at least two layers in which a first layer adjacent to the head skirt portion is completely formed into a plate-like shape; a second layer has an annular outer layer having deformation resistance weaker than that of the first layer and an inner layer fitted in a central space of the outer layer and having deformation resistance further weaker than that of the outer layer.

When the protective container mounting a tank falls, in such a manner that its head portion faces downwards, the second layer of the head support member is compressive-deformed at the time of collision with the ground or the like. In particular, the inner portion of the outer layer is expanded toward the inner layer having a weaker distortion resistance. Therefore, the pressure for upwardly pushing the first layer toward the tank can be dispersed in the lateral direction so that collision of the head support member with the valve is effectively prevented. As a result, impact resistance can be improved and the head support member can be thinned as compared to the conventional structure.

A tank protective container according to the present invention is arranged to accommodate and protect the tank. Such tank protective container includes a valve in the head portion thereof and a substantially cylindrical head skirt portion adjacent to the head portion thereof, and is provided with the support member at least in the head portion (and the bottom portion) thereof. Such protective container for a tank includes a load receiving member disposed between the head skirt portion and the head support member and has a projection to which a free end of the head skirt portion is fixed; and a structure formed by the head support member and having at least two layers in which a first layer adjacent to the head skirt portion is completely formed into a plate-like shape, a second layer has an annular outer layer having deformation resistance weaker than that of the first layer and an inner layer fitted in a central space of the outer layer and having deformation resistance further weaker than that of the outer layer.

The combined characteristics of the load receiving member and the head support member prevents deformation of the head support member towards the tank and intrusion of the head skirt portion at the time of falling so that the valve is protected. Also the deformation of the head skirt portion can be prevented, and impact can be dispersed and absorbed. Moreover, the head support member and the bottom support member can be thinned as compared to the conventional structure.

It is noted that the head support member may, on the outside of the second layer, have a third layer having deformation resistance weaker than that of the first layer and stronger than that of the second layer.

It is preferable that a third layer, which does not deform at the time of performing a puncture test or the like, be further provided.

The rotation stoppers may be fastened to the head skirt portion or the bottom skirt portion and the protective container in order to prevent relative movement of the tank in the protective container.

Since the angle, at which the tank is accommodated in the protective container, is previously set, the tank can be attached in such a manner that the valve is not exposed through an opening when the protective container is opened at the time of performing a drop test or the like. If a fire takes place, damages to portions having poor heat resistance due to direct contact of the flame with the valve through the opening can be prevented.

The head support member may have a recess portion at a position facing the valve. As a result, the valve can be further reliably protected at the time of the fall or the like. It is further noted that the tank is a tank filled with $UF_6$.

These and other features of the invention will be understood upon reading of the following description along with the drawings.

BRIEF DESCRIPTION OF THE DRAWINGS

FIG. 6 is a partial and vertical cross-sectional view showing a state of deformation of the head support member when the protective container accommodating the tank falls in such a manner that its head portion faces downwards;

FIG. 7 is a partial cross-sectional view of the protective container according to another embodiment of the present invention; and FIG. 8 is a cross-sectional view showing an essential portion of the rotation-stopper according to the other embodiment.

DETAILED DESCRIPTION OF THE PREFERRED EMBODIMENTS

Figure 1:
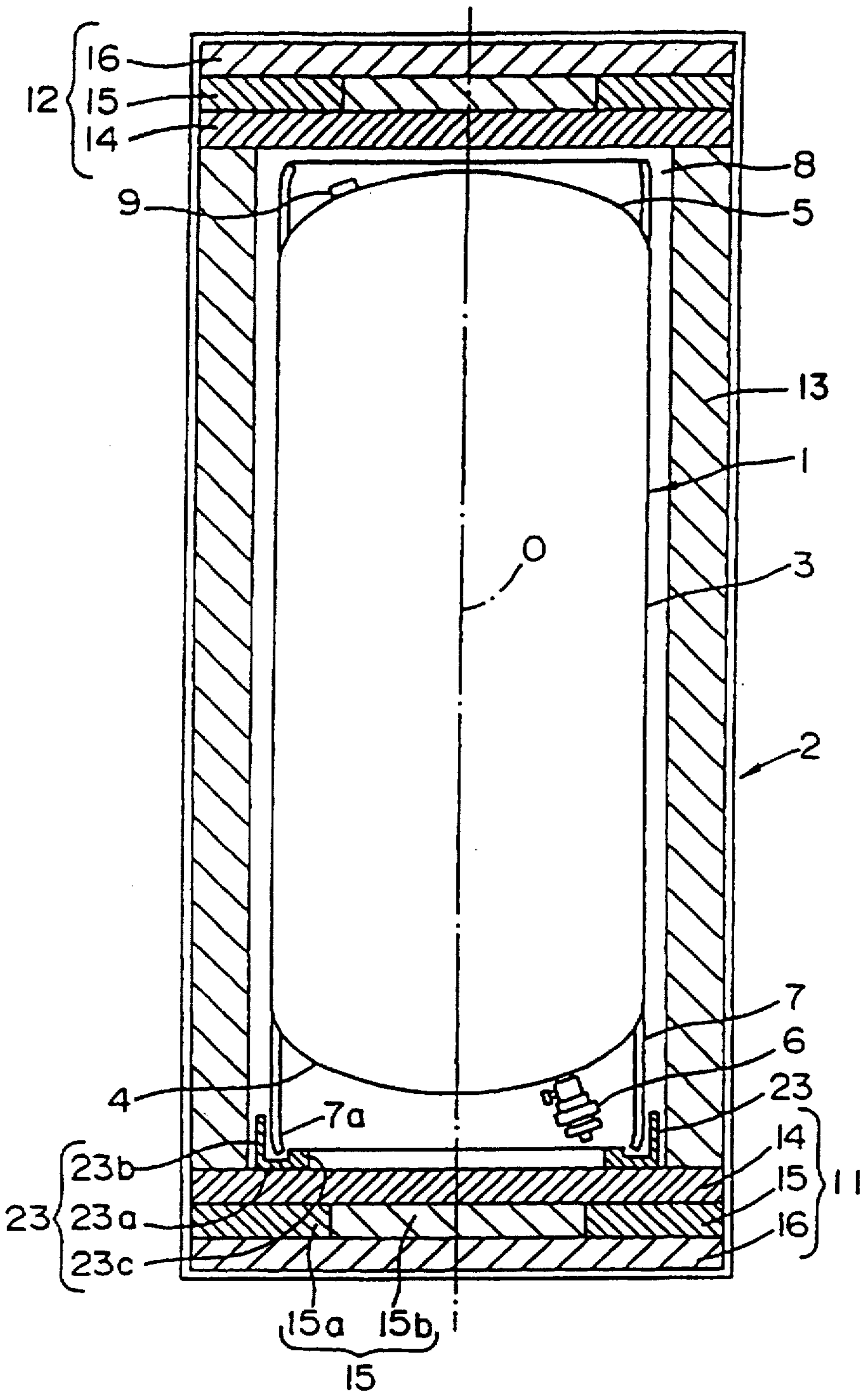
FIG. 1 is a vertical cross-sectional view showing on embodiment of the present invention, and taken along the lengthwise direction of the protective container accommodating the tank.

In reference to FIG. 1, a $UF_6$ tank (hereinafter, referred to as a "tank") 1 is stored or transported in such a manner that the tank 1 is hermetically accommodated in a protective container 2. Moreover, the outer surface of the protective container 2 is fixed and secured by a frame (not shown).

The tank 1 is formed into, for example, a capsule-like shape having a cylindrical side portion 3 which has two ends respectively formed into a head portion 4 and a bottom portion 5 each of which is formed into a substantially convex shape. A valve 6 is provided near the side surface and apart from the lengthwise directional central axis 0 common to the tank 1 and the protective container 2 in the accommodated state. Such valve 6 is attached to the head portion 4.

A head skirt portion 7 and a bottom skirt portion 8, each of which has a cylindrical shape, are connected to two extensions from the ends of the side portion 3 of the tank 1. The head skirt portion 7 forwardly extends over the valve 6 and the head portion 4 to protect the valve 6 and the head portion 4, while the bottom skirt portion 8 projects and extends from a plug 9 (a sealing cap) and the bottom portion 5 to protect the plug 9 and the bottom portion 5. The diameter of the free end of each of the head and bottom skirt portions 7, 8 is reduced so as to be somewhat warped inwards.

The protective container 2 is formed into a cylindrical shape having a bottom, and has a head portion provided with disc-like head support member 11. Similarly, disc-like bottom support member 12 are provided for the bottom portion of the protective container 2. Disposed between the two support members 11, 12 is a cylindrical heat insulating member 13. The heat insulating member 13 is made of a material (e.g., phenolic foam or the like) exhibiting excellent flexibility, and extends to the side region surrounding the tank 1. The two ends of the heat insulating member 13 are respectively connected to the head support member 11 and the bottom support member 12.

The head support member 11 and the bottom support member 12 have the same structure. The head support member 11 is formed into, for example, a triple layer structure formed by stacking, in a direction of the axial line 0 from the tank 1 toward the outside (i.e., a first layer 14, a second layer 15 and a third layer 16 each having the same outer diameter). Each layer serves as a shock absorbing member.

The first layer 14 is formed into a disc-like shape and made of a material (for example, oakwood) having excellent deformation resistance.

The second layer 15 includes a ring-like outer layer 15*a* and a disc-like inner layer 15*b* to be fitted in a hollow portion of the outer layer 15*a* and having a smaller diameter. The outer layer 15*a* is made of a material (for example, balsa wood) having deformation resistance weaker than that of the first layer 14, while the inner layer 15*b* is made of a material (such as, phenolic foam) exhibiting excellent flexibility (i.e., a material having deformation resistance weaker than that of the outer layer 15*a*).

The third layer 16 is formed into a disc-like shape and made of a material (for example, balsa wood) similar to that of the outer layer 15*a* which has a relatively weak deformation resistance.

The bottom support member 12 has the same structure.

Figure 2:
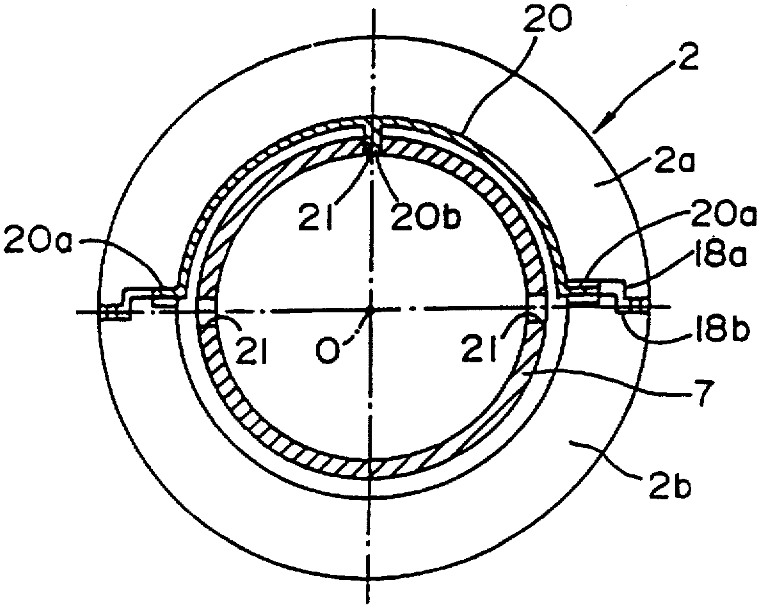
FIG. 2 is a lateral cross-sectional view showing a head skirt portion of the protective container shown in FIG. 1.

The protective container 2 is, as shown in FIG. 2, vertically divided into two sections in the lengthwise direction thereof along a plane including the central axis 0, the two sections being an upper half 2*a* and a lower half 2*b*. The halves 2*a* and 2*b* have corresponding stepped portions 18*a* and 18*b* so as to be connected to each other. When the tank 1 is mounted or removed, the upper half 2*a* and the lower half 2*b* can be separated from each other.

Figure 3:
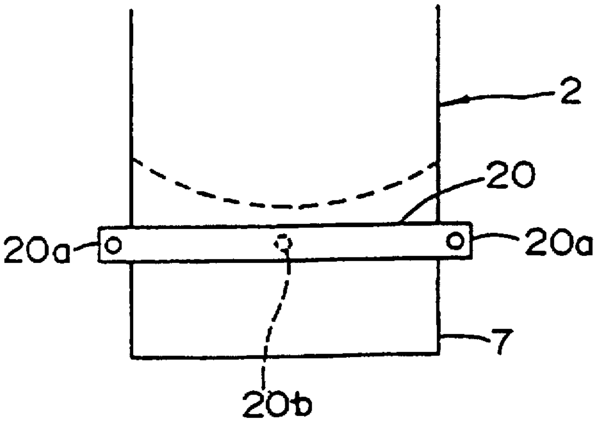
FIG. 3 is a plan view showing a state where the rotation-stopper is attached to the head skirt portion of the tank.
Figure 4:
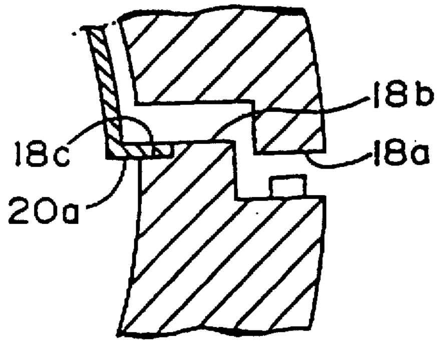
FIG. 4 is a partial cross-sectional view showing a state where the rotation-stopper shown in FIG. 3 is attached to the protective container.

As shown in FIGS. 2 to 4, a rotation-stopper 20 for the tank 1 is attached to the head skirt portion 7. The rotation-stopper 20 is formed into, for example, a band-like semi-circular arc shape disposed along the outer surface of the tank 1 and having flat engaging members 20*a* at the two lengthwise directional ends thereof. Moreover, a pin 20*b* is implanted in the inner surface of the rotation-stopper 20 so as to be received by and fixed to any of holes 21, the number of which is determined appropriately to be disposed at predetermined intervals around the circumferential direction of the head skirt portion 7, so that the rotation-stopper 20 is attached to the head skirt portion 7.

The engaging members 20*a* of the rotation-stopper 20 are inserted into grooves 18*c* formed in either connection surface of the stepped portions 18*a* and 18*b* of the upper and lower halves 2*a* and 2*b* so that the tank 1 is secured in such a manner that relative rotation of the tank in the protective container 2 is prevented.

Referring to FIG. 1, a load receiving member 23 having a substantially L-shape cross-section and formed into a substantially annular shape is attached to a free end 7*a* of the head skirt portion 7.

The load receiving member 23 has a flat bottom portion 23*a* in the substantially L-shape cross-section thereof so as to be interposed between the free end 7*a* of the head skirt portion 7 and the head support member 11. A side wall 23*b* extending substantially perpendicularly to the bottom portion 23*a* and formed into a cylindrical shape is disposed at an outer end of the bottom portion 23*a* so as to extend between the outer surface of the head skirt portion 7 and the heat insulating member 13.

An annular projection 23*c* extending substantially perpendicularly to the bottom portion 23*a* is formed at an inner end of the bottom portion 23*a*. The projection 23*c* fixes the free end 7*a* of the head skirt portion 7 on the outer surface thereof. The projection 23*c* should be capable of fixing the free end 7*a* of the head skirt portion 7. For example, its height is the same as the thickness of the free end 7*a* of the head skirt portion 7, the height being considerably shorter than the height of the side wall 23*b*.

The load receiving member 23 is located outer in relation to the valve 6 so that contraction of the valve 6 is prevented when the drop test or the like is performed.

Since the embodiment of the present invention is structured as described above, the pin 20*b* is inserted into the appropriate hole 21 and the rotation-stopper 20 is attached prior to accommodating the tank 1 into the protective container 2 in such a manner that the valve 6 is located at an angular degree of about 90° from the pair of engaging members 20*a* at a position opposing the rotation-stopper 20 with respect to the head skirt portion 7 of the tank 1. Moreover, the load receiving member 23 is fixed to the free end 7*a* of the head skirt portion 7.

Accordingly, the engaging members 20*a* of the rotation-stopper 20 are inserted into the engaging groove 18*c* formed in the stepped portion 18*b* (or 18*a*) of the upper and lower halves 2*a* and 2*b*, and the tank 1 is accommodated in the lower half 2*b* in such a manner that the engaging stepped portions 18*a* and 18*b* are fixed to each other so that the two halves 2*a* and 2*b* are closed.

Then, the outer surface of the protective container 2 is fastened and secured by a frame or the like (not shown).

Thus, the tank 1 is accommodated in the protective container 2 in a state where it is fastened and secured when the tank 1 is stored or transported.

According to the structural arrangement of this embodiment, if the protective container 2 accommodating the tank 1 falls vertically due to a drop test or an accident in such a manner that the head portion of the protective container 2 faces downwards, the inertia force of the dropping protective container 2 can be absorbed because the head support member 11 is deformed when it collides with the ground or the like.

Figure 5:
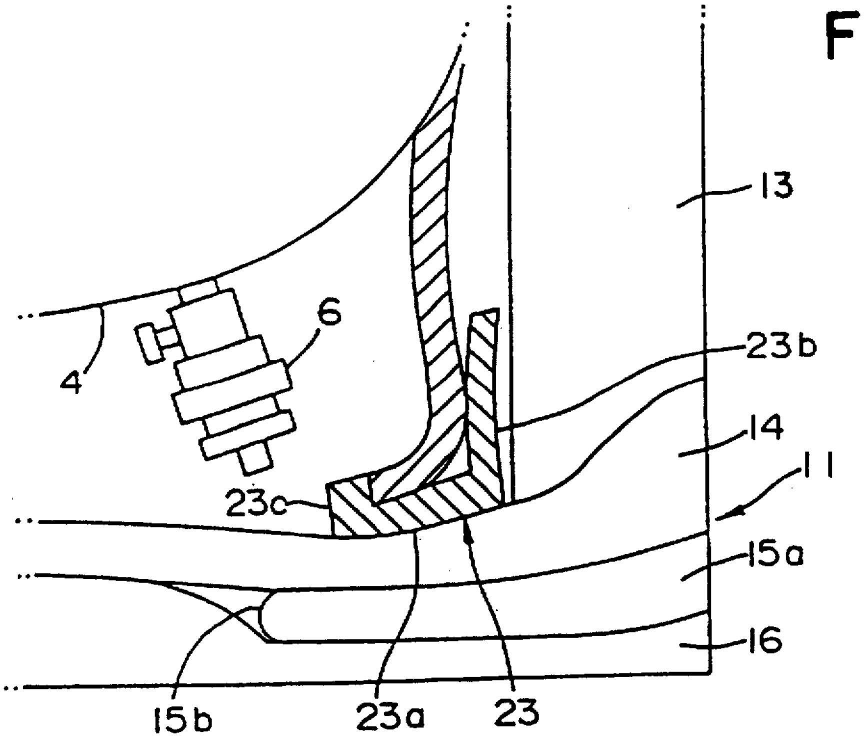
FIG. 5 is a partial and vertical cross-sectional view showing a state of deformation of the head skirt portion when the protective container accommodating the tank falls in such a manner that its head portion faces downwards.

At this time, the head support member 11 is compressed between the ground or the like and the tank 1, and therefore it is deformed. The inertia force of the tank 1 causes the free end 7*a* of the head skirt portion 7 to press against the head support member 11 through the load receiving member 23. Thus, the head support member 11 is deformed. Since the free end 7*a* is warped inwards in the foregoing case, it is pressed with respect to the bottom portion 23*a* of the load receiving member 23 in a direction in which it is moved inwards in the radial direction so as to be restrained by the projection 23*c*. Thus, a portion near the free end 7*a* of the head skirt portion 7 is warped so that it is brought into contact with the side wall 23*b*. As a result, warp of the portion near the free end 7*a* of the head skirt portion 7 is prevented. Moreover, the inertia force causes the outer surface of the head skirt portion 7 to press against the side wall 23*b*, causing the degree of the warp to be limited such that the head skirt portion 7 is not considerably curved (see FIG. 5).

Since the conventional structure, which is not provided with the load receiving member 23, has the structural arrangement whereby the end of the free end 7*a* of the head skirt portion 7 is in direct contact with the head support member 11, the end of the free end 7*a* is intruded into the head support member 11 due to the inertia force. Moreover, the exerted stress causes the head support member 11 in the peripheral portion to expand toward the tank 1. Thus, there arises a risk that the head support member 11 collides with the valve 6. In order to prevent such risk, the head support member must, inevitably, be thickened. Since the free end 7*a* is warped inwards, there arises another risk whereby the head skirt portion 7 is considerably warped and collides with the valve 6 at the time of a collision.

In view of the foregoing, in the embodiment of the present invention, when the protective container 2 collides with the ground or the like, the inertia force of the tank 1 is received by the entire bottom 23*a* of the load receiving member 23. Moreover, a portion of the load is received by the projection 23*c* and the side wall 23*b* so that concentration of the load due to the inertia force of the head support member 11 to a small area is prevented. The load is widely dispersed and absorbed by the load receiving member 23 so that intrusion of the head skirt portion 7 into the head support member 11 and considerable warp of the head skirt portion 7 are prevented. Therefore, the fear of the valve 6 being damaged can be reliably eliminated without thickening the head support member 11.

When the head support member 11 collides with the ground or the like and is thus deformed, the structural arrangement, whereby that the second layer 15 and the third layer 16 are made of materials each having the deformation resistance weaker than that of the first layer 14, results in easy deformation. In particular, since the inner layer 15*b* of the second layer 15 is made of the material having a flexibility superior to those of the outer layer 15*a* and the third layer 16, the inner portion of the outer layer 15*a* is deformed toward the inner layer 15*b* as shown in FIG. 6 so that it is compressed from the outer portion. Moreover, the central portion of the third layer 16 is also expanded toward the inner layer 15*b*. The expansions of the outer layer 15*a* and the central portion of the third layer 16 are dispersed and absorbed by the overall body of the inner layer 15*b* and the force are not concentrated in a direction in which the first layer 14 is pushed upwards toward the tank 1. Thus, the upwardly pushing operation of the head support member 11 is significantly prevented.

Therefore, the fear that the head support member 11 causes damage by colliding with the valve 6 or the like can be eliminated.

On the other hand, the conventional structure, in which the head support member is formed by a single layer having the same thickness as that employed in this embodiment, causes the overall body of the central portion of the head support member pushed adversely by the head skirt portion 7 or the like of the tank 1 to be expanded toward the tank 1 at the time of collision with the ground or the like. Thus, a problem occurs whereby the central portion easily collides with the valve 6.

If the protective container 2 does not fall vertically, but rather falls diagonally in such a manner that its head portion faces downwards, load generated at the time of the collision is concentrated at the corner of the head support member 11 of the protective container 2. The scheme of the impact deformation and absorption by the load receiving member 23 and the head support member 11 is the same as that in the case of the vertical fall.

As described above, according to this embodiment, the load receiving area of the tank 1 can be enlarged due to the load receiving member 23 so that local deformation of the head support member 1, causing the head skirt portion 7 to be intruded deeply and allowed to collide with the valve 6, is reliably prevented. Moreover, the projection 23*c* of the load receiving member 23 prevents the head skirt portion 7 from being considerably deformed. Since the head support member 11 has the triple-layer structure, excessive expansion of the overall body of the central portion of the head support member 11 towards the tank 1 resulting in collision with the valve 6 at the time of a fall or collision can be prevented.

Therefore, the impact resistance can be improved without the necessity of the thickening of the head support member 11 as is required for the conventional protective container. Thus, the valve 6 can be reliably protected from being damaged at the time of a fall.

Since the bottom support member 12 also has the triple-layer structure, the impact resistance (in the case where the protective container 2 falls in such a manner that its bottom portion faces downwards) can be improved for the same reason. Moreover, its thickness can be relatively reduced. Therefore, the overall length of the protective container 2, along the central axis 0 thereof, can be shortened as compared to the conventional protective container and its size can be reduced. As a result, manufacturing, storing, transporting or the like can be made efficient and economical.

Moreover, the relative rotation and movement of the tank 1 in the protective container 2 are prevented by the rotation-stopper 20. Since the valve 6 is disposed apart from the engaging stepped portions 18*a* and 18*b* of the upper and lower halves 2*a* and 2*b* by an angular degree of about 90°, the valve 6 cannot be exposed through an opening formed if the upper and lower halves 2*a* and 2*b* slip and open due to the impact generated at the time of a fall or the like of the protective container 2. Therefore, there is substantially no possibility that flame can be in direct contact with the valve 6 through the opening in the presence of fire. As a result, elements of the valve 6 having poor heat resistance can be protected from being damaged, and the safety of the valve 6 can be improved.

It is noted that the head support member 11 and the bottom support member 12 are not required to be formed into the triple-layer structure. A double-layer structure consisting of the first layer 14 and the second layer 15 may be employed. Another structure having four or more layers formed by adding the same one as second layer 15 or the third layer 16 may be employed.

If the double-layer structure is employed, the second layer of the head support member is compressive-deformed and the inner portion of the outer layer is expanded toward the inner layer having weak deformation resistance. Therefore, the load for upwardly pushing the first layer toward the tank is dispersed in the lateral direction.

However, the double-layer structure is not preferable because it is advantageous that a layer, which is not considerably deformed, is left in the outer layers when a puncture test (the protective container 2 dropped from a height of 1 m from a steel bar having a diameter of 150 mm) is performed. If a structure having four or more layers is employed, each of the support members 11 and 12 is thickened to the thickness of the conventional support member. Consequently, such conditions become unsatisfactory.

Another embodiment of the present invention will now be described with reference to FIG. 7.

In reference to FIG. 7, the rotation-stopper 20 is attached to the tank 1, as described in the foregoing embodiment, so that the position of the valve 6 is fixed in a state whereby the tank 1 is accommodated in the protective container 2. A recess portion 25 is formed in the head support member 11 at a position in the direction of the axial line 0 opposing the valve 6. The recess portion 25 is formed by cutting the first layer 14.

The foregoing structure is able to further eliminate a situation whereby the valve 6 collides with the head support member 11, at the time of a collision or the like, so that the safety is further improved.

The structure for engaging the rotation-stopper 20 to the upper and lower halves 2*a* and 2*b* is not required to be the engaging member 20*a* and the engaging groove 18*c* as employed in the foregoing embodiment. For example, a structure shown in FIG. 8 may be employed in which a pin 29 secured, by threads or the like, to a rotation-stopper 28 having a substantially circular arc shape is received by an engaging hole 30 formed in either of the stepped portion 18*a* or 18*b* of the upper and lower halves 2*a* and 2*b*.

The engaging groove 18*c* and the engaging hole 30 are not required to be formed in the stepped portion 18*a* or 18*b*.

They may be formed at arbitrary positions in the circumferential direction of the upper and lower halves 2a and 2b.

As a matter of course, the rotation-stopper 20 may be provided for the bottom skirt portion 8.

Although the foregoing embodiments have structural arrangements such that both of the head support member 11 and the bottom support member 12 are formed into the same triple-layer structures not to specify the direction of the head portion 4 (having the valve 6) of the tank 1 when the tank 1 is accommodated in the protective container 2, specification of the direction, in which the head portion 4 is accommodated, will enable a structure (in which only either support member (the head support member 11) has two or more layers according to the present invention and the other support member (the bottom support member 12) is formed into a single layer) to be employed.

Although the foregoing embodiments have the structure such that the load receiving member 23 is provided for the head skirt portion 7, it may be provided for the head portion members 11. In the foregoing case, the load receiving member 23 is divided to be adaptable to the upper half 2a and the lower half 2b.

Although the foregoing embodiments have been described with respect to the $UF_6$ tank filled with $UF_6$, the present invention is not limited to this. As a matter of course, the protective container according to the present invention may be used as in any of a variety of tanks.

As described above, the tank protective container according to the present invention has the structure such that the load receiving member, having a projection, to which the free end of the head skirt portion is fixed, is provided between the head skirt portion and the head support member. Therefore, impact generated when the protective container falls, in such a manner that its head faces downwards and the protective container collides with the ground or the like, can be transmitted to the head support member while being dispersed and absorbed by the load receiving member. Thus, any fears that the head skirt portion is cut into the head support member and that the head support member is expanded toward the tank due to the load causing the valve to collide with the head support member can be eliminated. Since the projection portion fixes the free end of the head skirt portion, deformation of the head skirt portion can be prevented. As a result, the impact resistance can be improved; and the head support member can be thinned as compared to the conventional structure.

The tank protective container according to the present invention has the head support member formed into a structure having at least two layers. The second layer consists of the annular outer layer having deformation resistance weaker than that of the first layer and the inner layer fitted in the central space of the outer layer and having deformation resistance further weaker than that of the outer layer. Therefore, when the tank protective container falls onto and collides with the ground or the like, the inner portion of the outer layer of the head support member is expanded toward the inner layer having weaker deformation resistance. Therefore, the pressure for upwardly pushing the first layer can be dispersed and absorbed so that collision of the head support member with the valve is effectively prevented. As a result, the impact resistance can be improved and the head support member can be thinned as compared to the conventional structure.

The tank protective container according to the present invention has the load receiving member between the head skirt portion and the head support member. Moreover, the head support member has the structure having at least two layers. The second layer includes the annular outer layer having weaker deformation resistance than that of the first layer and the inner layer fitted in the central space of the outer layer and having deformation resistance being weaker than that of the outer layer. Therefore, the combined effects of the load receiving member and the head support member prevents deformation of the head support member towards the tank and intrusion of the head skirt portion in case of a fall or the like so that the valve is protected. Moreover, deformation of the head skirt portion can be prevented. Furthermore, the head support member and the bottom support member can be thinned to achieve the foregoing protection and prevention. Since the overall length of the protective container can be shortened and the size of the same can be reduced, manufacturing, storing and transporting can be made efficient, and the manufacturing and transporting costs can be reduced.

The head support member has the third layer on the outside of the second layer, the third layer having deformation resistance weaker than that of the first layer and stronger than that of the second layer. Therefore, the third layer, which cannot be considerably deformed at the time of a fall or the like, exists so that a preferred result is realized when the puncture test or the like is performed.

Since the rotation stoppers are fastened to the head skirt portion or the bottom skirt portion and the protective container, mutual movement of the tank in the protective container can be prevented. Therefore, the angle, at which the tank is accommodated in the protective container, can be set beforehand. Thus, even if the protective container is opened at the time of the drop test or the like, the tank can be mounted at a position, where the valve is not exposed through an opening. Even if a fire takes place, flame does not directly come in contact with the valve having poor heat resistance are not damaged.

Since the recess portion facing the valve is formed in the head support member, the valve can further be reliably protected at the time of a fall.

While the invention has been particularly shown and described in reference to preferred embodiments thereof, it will be understood by those skilled in the art that changes in form and details may be made therein without departing from the spirit and scope of the invention.

What is claimed is:

1. A protective container arranged to accommodate and protect a tank, which has a valve in the head portion thereof and a substantially cylindrical head skirt portion adjacent to the head portion thereof, and provided with a support member at least in the head portion thereof, said tank protective container comprising:

a load receiving member disposed between said head skirt portion and said head support member, said load receiving member having a projection to which a free end of said head skirt portion is fixed, wherein said load receiving member is capable of receiving said free end of said head skirt portion, when said support member is deformed, and limiting warping of said head skirt portion.

2. A protective container arranged to accommodate and protect a tank having a valve in the head portion thereof and a substantially cylindrical head skirt portion adjacent to the head portion thereof, said tank protective container comprising:

a head support member located proximate the head portion of the tank, the head support member having at least two layers in which a second layer formed adjacent to a first layer near said head skirt portion has an annular outer layer having deformation resistance weaker than that of said first layer and an inner layer fitted in a central space of said outer layer and having deformation resistance further weaker than that of said outer layer.

3. A protective container arranged to accommodate and protect a tank having a valve in the head portion thereof and a substantially cylindrical head skirt portion adjacent to the head portion thereof, said tank protective container comprising:

a head support member located proximate the head portion of the tank; and a load receiving member disposed between said head skirt portion and said head support member and having a projection to which a free end of said head skirt portion is fixed, wherein said load receiving member is capable of receiving said free end of said head skirt portion, when said support member is deformed, and limiting warping of said head skirt portion, and wherein said head support member includes at least two layers in which a second layer formed adjacent to a first layer near said head skirt portion has an annular outer layer having deformation resistance weaker than that of said first layer and an inner layer fitted in a central space of said outer layer and having deformation resistance further weaker than that of said outer layer.

4. A protective container according to claim 2 or 3, wherein a third layer has deformation resistance weaker than that of said first layer and stronger than that of said second layer, and wherein said third layer is, on the outside of said second layer, provided for said head support member.

5. A protective container according to claims 1, 2 or 3, wherein a rotation stopper is fixed to said head skirt portion or said bottom skirt portion and said protective container so that relative movement of said tank in said protective container is prevented.

6. A protective container according to claim 5, wherein said head support member has a recess portion at a position facing said valve.

* * * * *